& Seas, PLLC

United States Patent [19]
Ito

[11] Patent Number: 5,960,123
[45] Date of Patent: *Sep. 28, 1999

[54] METHOD AND APPARATUS FOR ENHANCING CONTRAST IN IMAGES BY EMPHASIS PROCESSING OF A MULTIRESOLUTION FREQUENCY BAND

[75] Inventor: Wataru Ito, Kanagawa, Japan

[73] Assignee: Fuji Photo Film Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/685,616

[22] Filed: Jul. 24, 1996

[30] Foreign Application Priority Data

Jul. 27, 1995 [JP] Japan .................................. 7-191522

[51] Int. Cl.[6] .............................. G06K 9/40; G06K 9/36; G06K 9/00
[52] U.S. Cl. .......................... 382/274; 382/240; 382/128; 382/132
[58] Field of Search .................................. 382/240, 302, 382/132, 128, 264, 274; 250/584, 586; 378/98.4, 207, 62

[56] References Cited

U.S. PATENT DOCUMENTS

| | | | |
|---|---|---|---|
| 5,461,655 | 10/1995 | Vuylsteke et al. | 378/62 |
| 5,467,404 | 11/1995 | Vuylsteke et al. | 382/274 |
| 5,473,373 | 12/1995 | Hwung et al. | 348/254 |
| 5,644,662 | 7/1997 | Vuylsteke | 382/302 |

FOREIGN PATENT DOCUMENTS

| | | | |
|---|---|---|---|
| 0574969 | 12/1993 | European Pat. Off. | G06F 15/68 |
| 0610604 | 8/1994 | European Pat. Off. | G06F 15/68 |
| 0712092 | 5/1996 | European Pat. Off. | G06T 1/00 |

OTHER PUBLICATIONS

"Contrast Enhancement Using Burt Pyramid Processing", Bessler & Arbeiter SID 86 Digest (May 1986) 17 352–353.
"The Laplacian Pyramid as a Compact Image Code", Burt & Adeloon IEEE Transactions on Communications, *Com 31* (1983) 532–540.
"Multiscale Image Contrast Amplification", Vuylsteke & Schaeters SPIE 2167 (1994) 551–560.
"Fast Filter Transforms for Image Processing", Burt Computer Graphics and Image Processing 16 (1981) 20–51.
"Fast Computation of the Difference of Low–Pass Transform", Crowley & Stern IEEE Transactions on Pattern Analysis and Machine Intelligence, PAMI-6 (1984) 212–222.

(List continued on next page.)

*Primary Examiner*—Thomas D. Lee
*Assistant Examiner*—Wenpeng Chen
*Attorney, Agent, or Firm*—Sughrue, Mion, Zinn, Macpeak & Seas, PLLC

[57] ABSTRACT

An original image is transformed into a multi-resolution space and is thereby decomposed into images, each of which is of one of a plurality of different frequency bands. Emphasis processing is carried out on an image of a predetermined frequency band, which is among the plurality of the different frequency bands, by setting the degrees of emphasis such that the degree of emphasis for a picture element of the image of the predetermined frequency band, which picture element has a picture element value larger than a predetermined threshold value, may be set to be lower than the degrees of emphasis for the other picture elements of the image of the predetermined frequency band. An inverse transform is then carried out on the image of the predetermined frequency band, which has been obtained from the emphasis processing, and the images of the other frequency bands. A processed image signal is thereby obtained.

6 Claims, 8 Drawing Sheets

OTHER PUBLICATIONS

"A Theory for Multiresolution Signal Decomposition: The Wavelet Representation", Mallat IEEE Transactions on Pattern Analysis and Machine Intelligence, 11 (1989) 674–693.

"Wavelets and Signal Processing", Rioul & Vetterli, IEEE Spectrum Magazine (1991) 14–38.

"Zero–Crossings of a Wavelet Transform," Mallat, IEEE Transactions on Information Theory 37 (1991) 1019–1033.

"Contrast Enhancement by Dyadic Wavelet Analysis", Laine, Far, & Schuler Engineering in Medicine and Biology Society, Engineering Advances: New Opportunities for Biomedical Engineers, Proc. 16th Am. InH Conf. IEEE, 10a–11a (1994).

"Mammographic Feature Enhancement by Multiscale Analysis", Laine, Schuler, Fan, Huda, IEEE Transactions on Medical Imaging 13 (1994) 725–740.

"Image Compression by Gabor Expansion", Ebrach ai & Kurt, Optical Engineering 3D (1991) 873–880.

"Nonlinear Filtering Using Generalized Subband Decomposition"; K. Anandakumar et al. Department of Electrical Engineering; University of Pennsylvania; Philadelphia PA; XP000607766; Proceedings International Conference on Image Processing, Washington, DC, USA Oct. 23–26 1995; pp. 382–385.

FIG.3

| 0.0025 | 0.0125 | 0.02 | 0.0125 | 0.0025 |
|--------|--------|------|--------|--------|
| 0.0125 | 0.0625 | 0.1  | 0.0625 | 0.0125 |
| 0.02   | 0.1    | 0.16 | 0.1    | 0.02   |
| 0.0125 | 0.0625 | 0.1  | 0.0625 | 0.0125 |
| 0.0025 | 0.0125 | 0.02 | 0.0125 | 0.0025 |

FIG.4
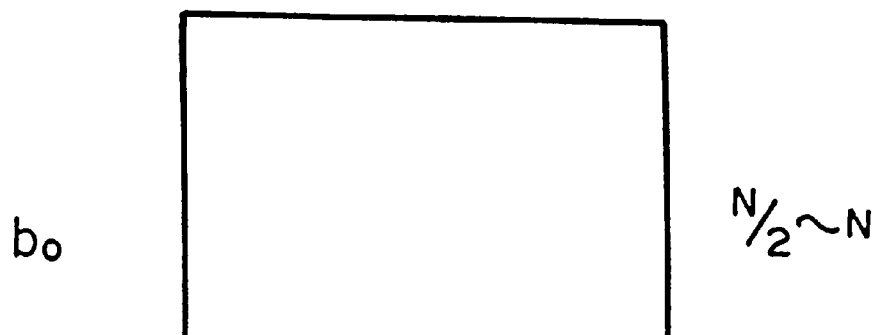
$b_0$      $N/2 \sim N$
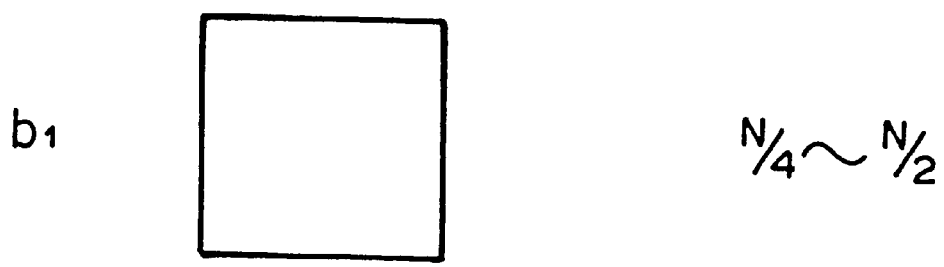
$b_1$      $N/4 \sim N/2$
$b_2$      $N/8 \sim N/4$
.
.
.
.
$b_{L-1}$      $N/2^L \sim N/2^{L-1}$
$g_L$      $0 \sim N/2^L$

METHOD AND APPARATUS FOR ENHANCING CONTRAST IN IMAGES BY EMPHASIS PROCESSING OF A MULTIRESOLUTION FREQUENCY BAND

BACKGROUND OF THE INVENTION

1. Field of the Invention

This invention relates to an image processing method and apparatus for carrying out image processing, such as emphasis processing, on an image of a predetermined frequency band in an original image.

2. Description of the Prior Art

Techniques for obtaining an image signal, which represents an image, carrying out appropriate image processing on the image signal, and then reproducing a visible image by use of the processed image signal have heretofore been known in various fields. For example, in Japanese Unexamined Patent Publication No. 55(1980)-163772, the applicant proposed a method for carrying out frequency emphasis processing, such as unsharp mask processing, on an image signal, such that a visible radiation image may be obtained, which has good image quality and can serve as an effective tool in, particularly, the efficient and accurate diagnosis of an illness. With the frequency processing, an unsharp mask signal is subtracted from an image signal representing an original image, the resulting difference value is multiplied by an emphasis coefficient, and the thus obtained product is added to the image signal. In this manner, predetermined frequency components in the image are emphasized.

A different method for carrying out frequency processing on an image signal has also been proposed. With the proposed frequency processing method, an image is transformed into multi-resolution images by a Fourier transform, a wavelet transform, a sub-band transform, or the like, and the image signal representing the image is thereby decomposed into signals falling within a plurality of different frequency bands. Thereafter, of the decomposed signals, a signal falling within a desired frequency band is subjected to predetermined image processing, such as emphasis.

Further, recently, in the field of image processing, a novel technique for transforming an image into a multi-resolution space, which is referred to as the Laplacian pyramid technique, has been proposed in, for example, Japanese Unexamined Patent Publication No. 6(1994)-301766. With the proposed Laplacian pyramid technique, mask processing is carried out on the original image by using a mask having characteristics such that it may be approximately represented by a Gaussian function. A sub-sampling operation is then carried out on the resulting image in order to thin out the number of the picture elements to one half along each of two-dimensional directions of the array of the picture elements in the image, and an unsharp image having a size of one-fourth of the size of the original image is thereby obtained. Thereafter, a picture element having a value of 0 is inserted into each of the points on the unsharp image, which were eliminated during the sampling operation, and the image size is thereby restored to the original size. Mask processing is then carried out on the thus obtained image by using the aforesaid mask, and an unsharp image is thereby obtained. The thus obtained unsharp image is subtracted from the original image, and a detail image of a predetermined frequency band of the original image is thereby obtained. This processing is iterated with respect to the obtained unsharp image, and N number of unsharp images having sizes of $\frac{1}{2}^{2N}$ of the size of the original image are thereby formed. As described above, the sampling operation is carried out on the image, which has been obtained from the mask processing with the mask having characteristics such that it may be approximately represented by the Gaussian function. Therefore, though the Gaussian filter is used actually, the same processed image as that obtained when a Laplacian filter is used is obtained. Also, in this manner, the images of low frequency bands, which have the sizes of $\frac{1}{2}^{2N}$ of the size of the original image are successively obtained from the image of the original image size. Therefore, the group of the images obtained as a result of the processing is referred to as the Laplacian pyramid.

The Laplacian pyramid technique is described in detail in, for example, "Fast Filter Transforms for Image Processing" by Burt P. J., Computer Graphics and Image Processing, Vol. 16, pp. 20–51, 1981; "Fast Computation of the Difference of Low-Pass Transform" by Growley J. L., Stern R. M., IEEE Trans. on Pattern Analysis and Machine Intelligence, Vol. 6, No. 2, March 1984; "A Theory for Multiresolution Signal Decomposition; The Wavelet Representation" by Mallat S. G., IEEE Trans. on Pattern Analysis and Machine Intelligence, Vol. 11, No. 7, July 1989; "Image Compression by Gabor Expansion" by Ebrahimi T., Kunt M., Optical Engineering, Vol. 30, No. 7, pp. 873–880, July 1991; and "Multiscale Image Contrast Amplification" by Pieter Vuylsteke, Emile Schoeters, SPIE, Vol. 2167, Image Processing (1994), pp. 551–560.

Japanese Unexamined Patent Publication No. 6(1994)-301766 mentioned above discloses a method, wherein emphasis processing is carried out on the images of all of the frequency bands in the Laplacian pyramid, which images have been obtained in the manner described above, and the image of each frequency band, which has been obtained from the emphasis processing, is then subjected to an inverse transform, and a processed image is thereby obtained. In the disclosed method, the image emphasis is carried out on the image signal of each frequency band by using the formula shown below.

$$y = -m \times (-x/m)^p \quad (x<0)$$

$$y = m \times (x/m)^p \quad (x \geq 0)$$

wherein x represents the picture element value of each picture element in the image, y represents the picture element value of each picture element in the image obtained from the emphasis processing, and m represents the range of values which the picture elements can take (for example, m=1,023 in cases where the range of values, which the picture elements can take, is 10 bits). Specifically, as the value of p becomes smaller, the degree of emphasis becomes higher. As the value of p becomes larger, the degree of emphasis becomes lower. The image emphasis is carried out with such a degree of emphasis. Also, in the method disclosed in Japanese Unexamined Patent Publication No. 6(1994)-301766, the value of p in the formula shown above is selected from the range of 0 to 1, the degree of emphasis for the picture element value of every picture element in the image, which is to be subjected to the emphasis processing, is thereby set to be larger than 1, and the emphasis processing is thus carried out. Specifically, the emphasis processing is carried out regardless of the picture element values of the image such that the degree of emphasis may be larger than 1 with respect to every picture element value. In the image obtained from such processing, the image has been emphasized in each frequency band. Therefore, an image is obtained such that unsharp mask processing might have been carried out substantially with masks having a plurality of sizes in the aforesaid unsharp mask processing.

Of the images of the plurality of different frequency bands, which images have been obtained from the aforesaid multi-resolution transform, the image of a comparatively high frequency band represents comparatively fine image portions, such as image edges, which are to be used. Therefore, the signal value, which corresponds to a certain picture element in the image of a comparatively high frequency band, represents the difference in contrast with picture elements located at positions comparatively close to the certain picture element. On the other hand, an image of a comparatively low frequency band represents a gentle change in the image information of the background in the original image. Therefore, the signal value, which corresponds to a certain picture element in the image of a comparatively high frequency band, represents the difference in contrast with picture elements located at positions comparatively remote from the certain picture element. Accordingly, the picture element values of the image of a comparatively low frequency band are larger than the picture element values of the image of a comparatively high frequency band.

For example, in an image, in which an image portion to be used, that has a comparatively high density, is embedded, in cases where the image regions surrounding the image portion have a low density, the level of contrast of the image portion with the surrounding image regions is comparatively high, and therefore the image is easy to view. However, in cases where the image regions surrounding the image portion have a comparatively high density, the level of contrast of the image portion with the surrounding image regions is comparatively low, and therefore the image is difficult to view.

As for such an image, if the emphasis processing is carried out with the method disclosed in Japanese Unexamined Patent Publication No. 6(1994)-301766, both the image portion to be used, which has the comparatively low level of contrast with the surrounding image regions, and the surrounding image regions will be emphasized together. Therefore, even if the emphasis processing is carried out, the image portion to be used cannot be rendered perceptible.

SUMMARY OF THE INVENTION

The primary object of the present invention is to provide an image processing method, wherein image processing is carried out such that an image portion, which has a comparatively low level of contrast with the surrounding image regions, may become more perceptible.

Another object of the present invention is to provide an apparatus for carrying out the image processing method.

The present invention provides an image processing method, comprising the steps of:

i) transforming an original image into a multi-resolution space, the original image being thereby decomposed into images, each of which is of one of a plurality of different frequency bands, ii) carrying out emphasis processing on an image of a predetermined frequency band, which is among the plurality of the different frequency bands, by setting the degrees of emphasis such that the degree of emphasis for a picture element of the image of the predetermined frequency band, which picture element has a picture element value larger than a predetermined threshold value, may be set to be lower than the degrees of emphasis for the other picture elements of the image of the predetermined frequency band, and iii) carrying out an inverse transform of the image of the predetermined frequency band, which has been obtained from the emphasis processing, and the images of the other frequency bands, a processed image signal being obtained from the inverse transform.

The present invention also provides an image processing apparatus, comprising:

i) an image decomposing means for transforming an original image into a multi-resolution space, the original image being thereby decomposed into images, each of which is of one of a plurality of different frequency bands, ii) an emphasis processing means for carrying out emphasis processing on an image of a predetermined frequency band, which is among the plurality of the different frequency bands, by setting the degrees of emphasis such that the degree of emphasis for a picture element of the image of the predetermined frequency band, which picture element has a picture element value larger than a predetermined threshold value, may be set to be lower than the degrees of emphasis for the other picture elements of the image of the predetermined frequency band, and iii) an inverse transform means for carrying out an inverse transform of the image of the predetermined frequency band, which has been obtained from the emphasis processing, and the images of the other frequency bands, and thereby obtaining a processed image signal.

The term "setting a degree of emphasis to be lower" as used herein means the weakening of the degree of emphasis and embraces the restriction of the image signal values.

Also, the term "transforming an original image into a multi-resolution space" as used herein means decomposing the image signal, which represents the original image, into image signals representing the images of a plurality of different frequency bands by using a predetermined filter for the Laplacian pyramid technique, the wavelet transform, the sub-band transform, or the like.

Of the images of the plurality of different frequency bands, which images have been obtained by transforming an original image into the multi-resolution space, the image of a comparatively high frequency band represents comparatively fine image portions, which are to be used. Therefore, the signal value, which corresponds to a certain picture element in the image of a comparatively high frequency band, represents the difference in contrast with picture elements located at positions comparatively close to the certain picture element. On the other hand, an image of a comparatively low frequency band represents a gentle change in the image information of the background in the original image. Therefore, the signal value, which corresponds to a certain picture element in the image of a comparatively high frequency band, represents the difference in contrast with picture elements located at positions comparatively remote from the certain picture element. Accordingly, the picture element values of the image of a comparatively low frequency band are larger than the picture element values of the image of a comparatively high frequency band.

The image processing method and apparatus in accordance with the present invention are based on such findings. With the image processing method and apparatus in accordance with the present invention, the emphasis processing is carried out on the image of the predetermined frequency band, which is among the images of the plurality of the different frequency bands having been obtained from the transform into the multi-resolution space and which is to be subjected to the emphasis processing, by setting the degrees of emphasis such that the degree of emphasis for a picture element of the image of the predetermined frequency band, which picture element has a picture element value larger than a predetermined threshold value, may be lower than the degrees of emphasis for the other picture elements of the image of the predetermined frequency band. Therefore, as for an image of a low frequency band, the picture elements of which take comparatively large picture element values, the degree of emphasis becomes low. As for an image of a high frequency band, the picture elements of which take comparatively small picture element values, the degree of emphasis becomes high. Also, in cases where the density of the image regions surrounding the image portion to be used have a comparatively high density, and therefore the image portion is imperceptible, the degrees of emphasis for the image regions surrounding the image portion to be used are set to be low, and the image portion to be used is emphasized to a high extent. Therefore, the image portion to be used can be rendered more perceptible.

BRIEF DESCRIPTION OF THE DRAWINGS

FIG. 3 is an explanatory view showing a low pass filter, FIG. 4 is an explanatory view showing detail images of a plurality of different frequency bands, which are obtained with a Laplacian pyramid technique.

DESCRIPTION OF THE PREFERRED EMBODIMENTS

The present invention will hereinbelow be described in further detail with reference to the accompanying drawings.

Figure 1:
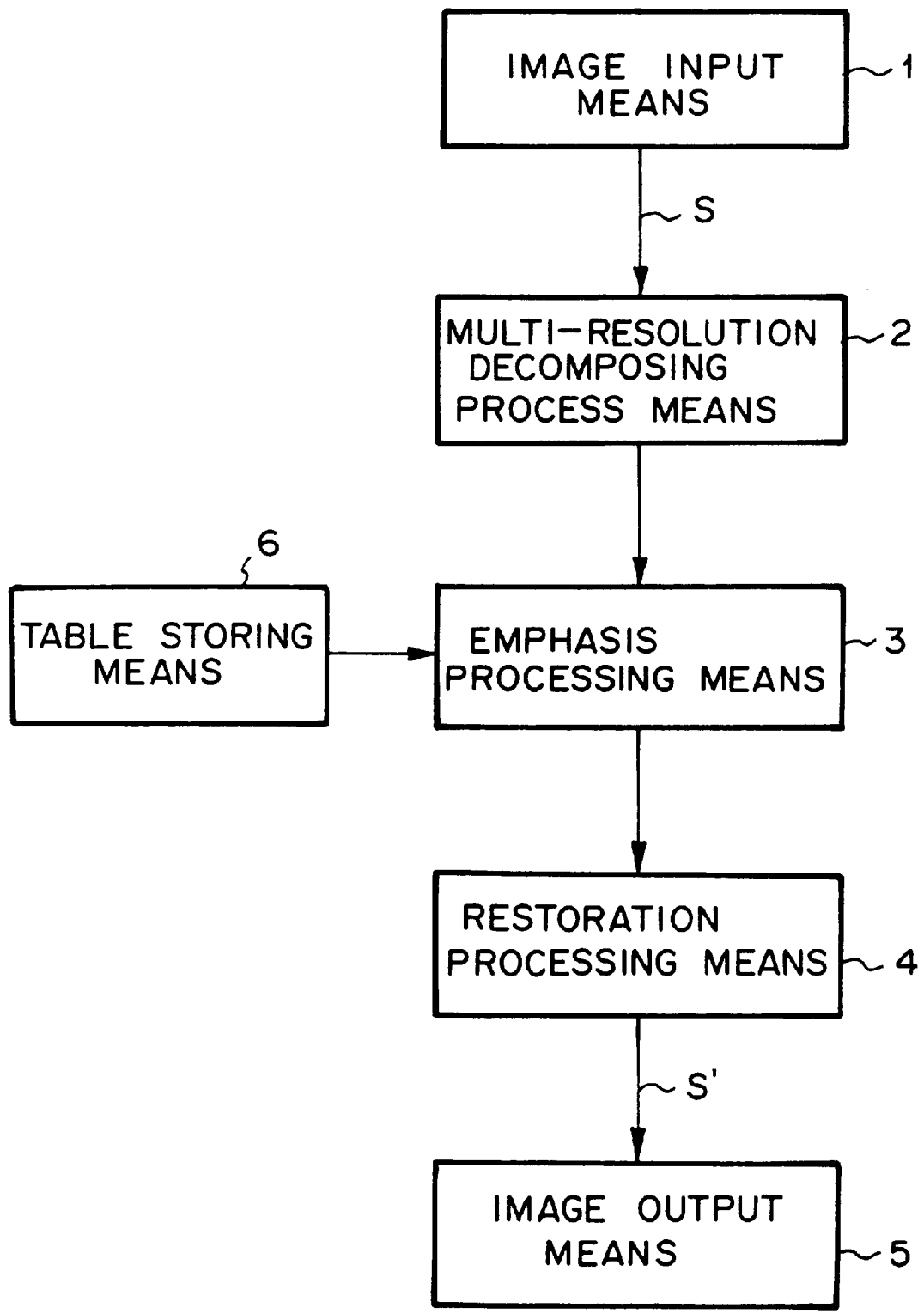
FIG. 1 is a block diagram showing an apparatus for carrying out an embodiment of the image processing method in accordance with the present invention.

FIG. 1 is a block diagram showing an apparatus for carrying out an embodiment of the image processing method in accordance with the present invention. As illustrated in FIG. 1, the apparatus for carrying out the embodiment of the image processing method in accordance with the present invention comprises an image input means 1 for feeding an image signal, which represents an original image, into the apparatus, and a multi-resolution decomposing process means 2 for carrying out a multi-resolution decomposing process on the original image and thereby obtaining decomposed images of a plurality of different frequency bands. The apparatus also comprises an emphasis processing means 3 for carrying out emphasis processing, which will be described later, on an image of a predetermined frequency band, which is among the decomposed images of the plurality of the different frequency bands having been obtained from the multi-resolution decomposing process means 2. The apparatus further comprises a restoration processing means 4 for restoring the image of the predetermined frequency band, which has been obtained from the emphasis processing carried out by the emphasis processing means 3, and the images of the other frequency bands into a processed image. The apparatus still further comprises an image output means 5 for reproducing the processed image, which has been restored by the restoration processing means 4, as a visible image. The apparatus also comprises a table storing means 6 for storing the information representing a table of the degree of emphasis for the emphasis processing, which is carried out by the emphasis processing means 3.

Figure 2:
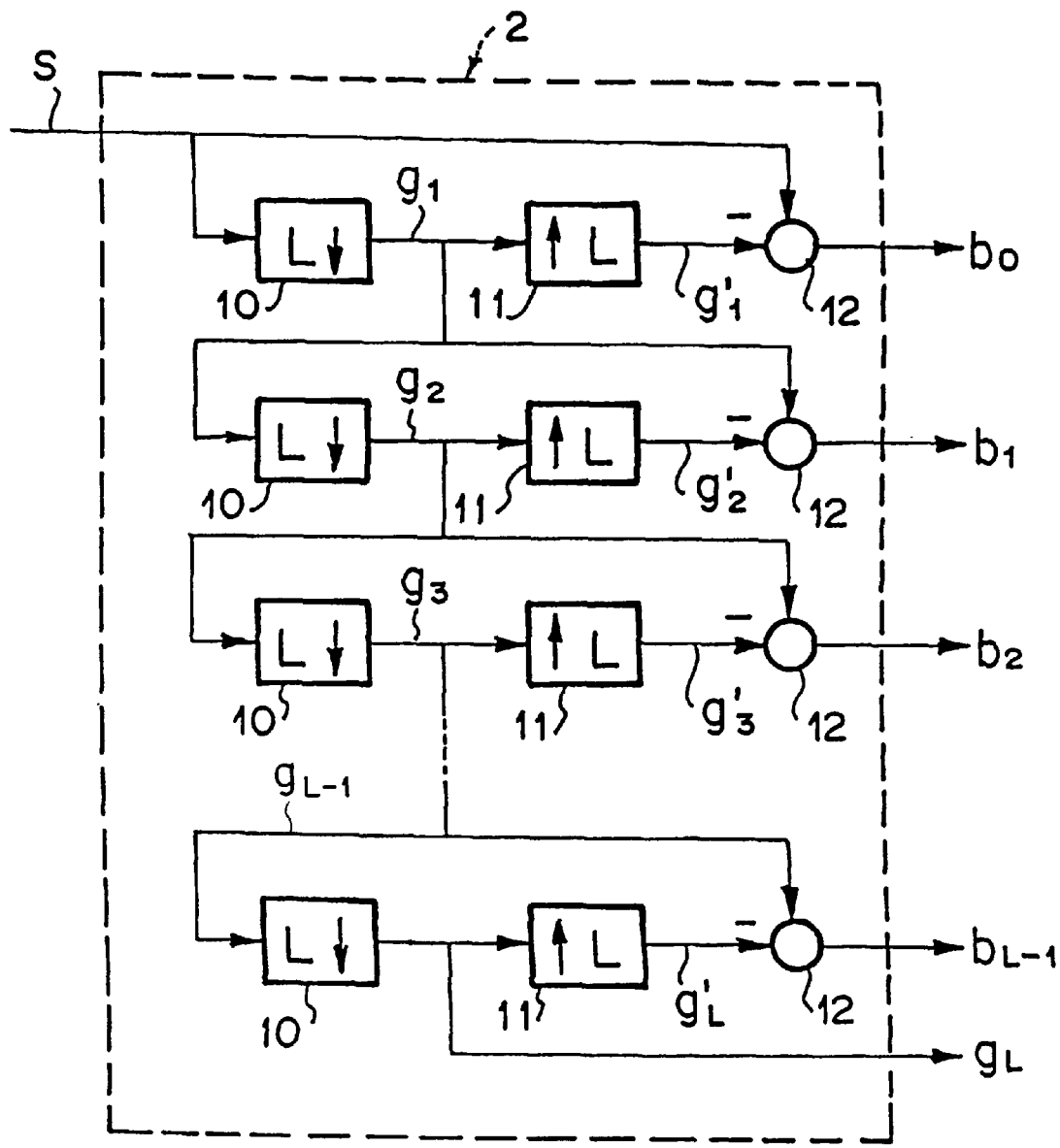
FIG. 2 is a block diagram showing a multi-resolution decomposing process means.

How the embodiment of the image processing method in accordance with the present invention operates will be described hereinbelow. FIG. 2 is a block diagram showing how the processing is carried out by the multi-resolution decomposing process means 2 shown in FIG. 1. In this embodiment, by way of example, the Laplacian pyramid technique is utilized in order to decompose an image signal S, which represents the original image, into multi-resolution images. As illustrated in FIG. 2, the digital image signal S, which represents the original image, is fed into a first filtering means 10 of the multi-resolution decomposing process means 2. In the multi-resolution decomposing process means 2, the digital image signal S is fed into a first filtering means 10, which carries out a filtering process on the digital image signal S by using a low pass filter. By way of example, as illustrated in FIG. 3, the low pass filter approximately corresponds to a two-dimensional Gaussian distribution on a 5×5 grid. As will be described later, the same types of low pass filters as that shown in FIG. 3 are utilized for all of the multi-resolution images.

Also, in the filtering means 10, the image signal S, which has been obtained from the filtering process carried out with the low pass filter, is subjected to a sampling process. The filtering means 10 samples the signal components of the image signal S at every second row and every second column in the array of picture elements of the original image. An image signal representing a low-resolution approximate image $g_1$ is thus obtained from the filtering means 10. The low-resolution approximate image $g_1$ has a size of one-fourth of the size of the original image. Thereafter, in a first interpolating operation means 11, a single picture element having a value of 0 is inserted into each of the points on the low-resolution approximate image $g_1$, which were eliminated during the sampling process. Specifically, a single picture element having a value of 0 is inserted between every set of two adjacent picture elements located along each row and each column in the array of picture elements of the low-resolution approximate image $g_1$. The low-resolution approximate image $g_1$, into which the picture elements having a value of 0 have thus been inserted at intervals of a single picture element, is unsharp, and the change in the signal value of the low-resolution approximate image $g_1$ is not smooth due to the picture elements having a value of 0, which have been inserted at intervals of a single picture element.

Further, in the first interpolating operation means 11, the low-resolution approximate image $g_1$, into which the picture elements having a value of 0 have been inserted in the manner described above, is subjected to a filtering process with the low pass filter shown in FIG. 3. An image signal representing a low-resolution approximate image $g_1'$ is thus obtained from the first interpolating operation means 11. The change in the signal value of the image signal representing a low-resolution approximate image $g_1'$ is smoother than the change in the signal value of the aforesaid low-resolution approximate image $g_1$, into which the picture elements having a value of 0 have been inserted. Also, the low-resolution approximate image $g_1'$ has the characteristics such that the image information of the frequency band higher than the middle frequency in the frequency band of the original image have been eliminated from the original image. This is because, as described above, the size of the low-resolution approximate image $g_1$ has been reduced to one-fourth of the size of the original image, the picture elements having a value of 0 have been inserted at intervals of a single picture element into the low-resolution approximate image $g_1$, and the filtering process has then been carried out on the low-resolution approximate image $g_1$ by using the low pass filter shown in FIG. 3. As a result, the image is obtained such that the image information of the frequency band higher than the middle frequency in the frequency band of the original image might have been blurred with the Gaussian function.

Thereafter, in a first subtracter 12, the image signal representing the low-resolution approximate image $g_1'$ is subtracted from the image signal S representing the original image, and an image signal representing a detail image $b_0$ is thereby obtained. Specifically, the image signal components of the image signal representing the low-resolution approximate image $g_1'$ and the image signal S representing the original image, which image signal components represent corresponding picture elements in the two images, are subtracted from each other. As described above, the low-resolution approximate image $g_1'$ has the characteristics such that the image information of the frequency band higher than the middle frequency in the frequency band of the original image might have been blurred. Therefore, the detail image $b_0$ represents only the image information of the frequency band higher than the middle frequency in the frequency band of the original image. Specifically, as illustrated in FIG. 4, the detail image $b_0$ represents the image information of the frequency band of N/2 to N, where N represents the Nyquist frequency of the original image.

Thereafter, the image signal representing the low-resolution approximate image $g_1$ is fed into a second filtering means 10 and subjected to the filtering process using the low pass filter shown in FIG. 3. Also, in the filtering means 10, the image signal representing the low-resolution approximate image $g_1$, which has been obtained from the filtering process, is subjected to a sampling process. The filtering means 10 samples the signal components of the image signal, which represents the low-resolution approximate image $g_1$, at every second row and every second column in the array of picture elements of the low-resolution approximate image $g_1$. An image signal representing a low-resolution approximate image $g_2$ is thus obtained from the filtering means 10. The low-resolution approximate image $g_2$ has a size of one-fourth of the size of the low-resolution approximate image $g_1$, i.e. a size of one-sixteenth of the size of the original image. Thereafter, in a second interpolating operation means 11, a single picture element having a value of 0 is inserted into each of the points on the low-resolution approximate image $g_2$, which were eliminated during the sampling process. Specifically, a single picture element having a value of 0 is inserted between every set of two adjacent picture elements located along each row and each column in the array of picture elements of the low-resolution approximate image $g_2$. The low-resolution approximate image $g_2$, into which the picture elements having a value of 0 have thus been inserted at intervals of a single picture element, is unsharp, and the change in the signal value of the low-resolution approximate image $g_2$ is not smooth due to the picture elements having a value of 0, which have been inserted at intervals of a single picture element.

Further, in the second interpolating operation means 11, the low-resolution approximate image $g_2$, into which the picture elements having a value of 0 have been inserted in the manner described above, is subjected to a filtering process with the low pass filter shown in FIG. 3. An image signal representing a low-resolution approximate image $g_2'$ is thus obtained from the first interpolating operation means 11. The change in the signal value of the image signal representing a low-resolution approximate image $g_2'$ is smoother than the change in the signal value of the aforesaid low-resolution approximate image $g_2$, into which the picture elements having a value of 0 have been inserted. Also, the low-resolution approximate image $g_2'$ has the characteristics such that the image information of the frequency components higher than the middle frequency in the frequency band of the low-resolution approximate image $g_1$ has been eliminated from the low-resolution approximate image $g_1$.

Thereafter, in a second subtracter 12, the image signal representing the low-resolution approximate image $g_2'$ is subtracted from the image signal representing the low-resolution approximate image $g_1$, and an image signal representing a detail image $b_1$ is thereby obtained. Specifically, the image signal components of the image signal representing the low-resolution approximate image $g_2'$ and the image signal representing the low-resolution approximate image $g_1$, which image signal components represent corresponding picture elements in the two images, are subtracted from each other. As described above, the low-resolution approximate image $g_2'$ has the characteristics such that the image information of the frequency band higher than the middle frequency in the frequency band of the low-resolution approximate image $g_1$ might have been blurred. Therefore, the detail image $b_1$ represents only the image information of the frequency band higher than the middle frequency in the frequency band of the low-resolution approximate image $g_1$. Specifically, as illustrated in FIG. 4, the detail image $b_1$ represents only the image information of the frequency band higher than the middle frequency in the frequency band of the low-resolution approximate image $g_1$, i.e. the image information of the frequency band of N/4 to N/2, where N represents the Nyquist frequency of the original image. In this manner, the detail image is obtained by carrying out the filtering process with the low pass filter having the Gaussian distribution. However, since the image having been obtained from the filtering process is subtracted from the low-resolution approximate image, substantially the same results as those obtained when the filtering process is carried out with a Laplacian filter can be obtained.

The processing described above is carried out successively for low-resolution approximate images $g_k$, where k=1 to N, which have been respectively filtered and sampled with the corresponding filtering means 10. In this manner, as illustrated in FIG. 4, n number of detail images $b_k$, wherein K=0 to L−1, and a residual image $g_L$ of the low-resolution approximate image are obtained. The levels of the resolution of the detail images $b_k$ successively become lower, starting with the resolution of the detail image $b_0$. Specifically, the frequency bands of the detail images $b_k$ successively become lower. The detail images $b_k$ respectively represent the frequency bands of $N/2^{k+1}$ to $N/2^k$ with respect to the Nyquist frequency N of the original image, and the sizes of the detail images $b_k$ become $\frac{1}{2}^{2k}$ times as large as the size of the original image. Specifically, the size of the detail image $b_0$, which has the highest resolution, is equal to the size of the original image, and the size of the detail image $b_1$, which has a high resolution next to the resolution of the detail image $b_0$, is one-fourth of the size of the original image. The sizes of the detail images thus successively become smaller, starting with the size equal to the size of the original image. Also, the detail images are substantially identical with the images obtained from the process using the Laplacian filter. Therefore, the multi-resolution transform in this embodiment is referred to as the Laplacian pyramid. The residual image $g_L$ may be regarded as being an approximate image having a very low resolution with respect to the original image. In extreme cases, the residual image $g_L$ is constituted of only a single piece of image information, which represents the mean value of the signal values of the original image. The information representing the detail images $b_k$ and the residual image $g_L$, which have thus been obtained, is stored in a memory (not shown).

Thereafter, in the emphasis processing means 3, emphasis processing is carried out on the detail images $b_k$, which have been obtained in the manner described above. How the emphasis processing is carried out will be described hereinbelow.

Figure 5A:
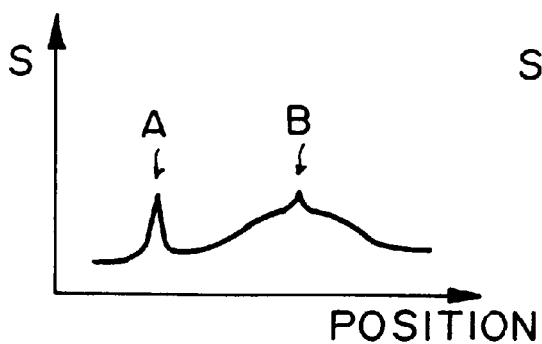
FIG. 5A is a graph showing a profile of an image signal representing an original image.
Figure 5D:
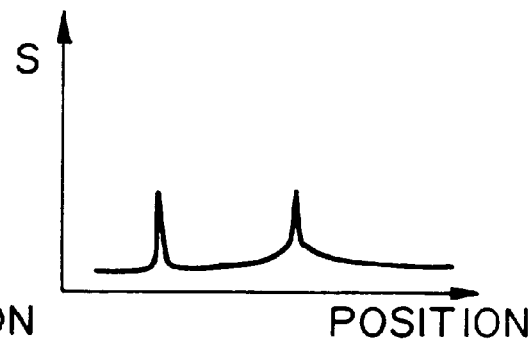
FIG. 5D is a graph showing a profile of a processed image signal.
Figure 5B:
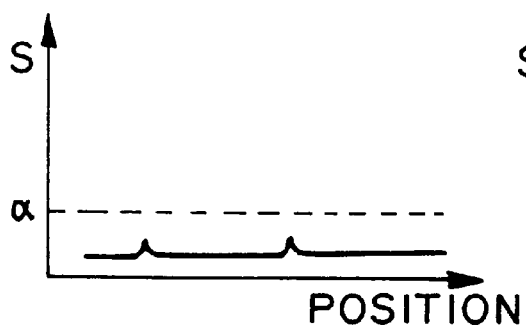
FIG. 5B is a graph showing a profile of an image signal representing an image of a comparatively high frequency band.
Figure 5E:
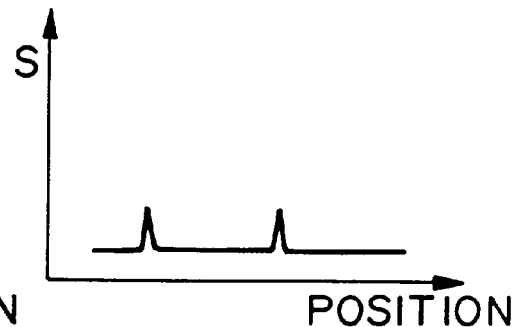
FIG. 5E is a graph showing a profile of an image signal representing an image of a comparatively high frequency band, which has been obtained from emphasis processing.
Figure 5C:
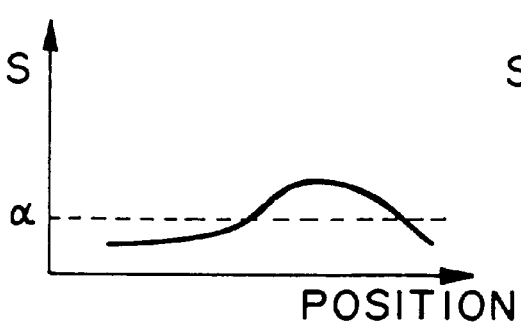
FIG. 5C is a graph showing a profile of an image signal representing an image of a comparatively low frequency band.

For example, in an image having the signal value distribution shown in FIG. 5A, when a portion A and a portion B are compared with each other, it will be found that the regions surrounding the portion A have a comparatively low density, and that the regions surrounding the portion B have a comparatively high density. Therefore, the portion B in the image is less perceptible than the portion A. In such cases, if the density in the regions surrounding the portion B is rendered low, the portion B will become more perceptible. The image processing method and apparatus in accordance with the present invention are based on such findings. In the embodiment of the image processing method in accordance with the present invention, as for a detail image $b_k$ of a predetermined frequency band, which is among the detail images $b_k$ having been obtained from the transform into the multi-resolution space and which is to be subjected to the emphasis processing, each of the picture element values of the detail image $b_k$ is compared with a predetermined threshold value $\alpha$. In cases where the picture element value of a picture element is larger than the threshold value $\alpha$, the degree of emphasis for the picture element is set to be low. In cases where the picture element value of a picture element is smaller than the threshold value $\alpha$, the degree of emphasis for the picture element is set to be high. For example, when the original image having the signal value distribution shown in FIG. 5A is transformed into the multi-resolution space by using the Laplacian pyramid technique, a signal of a comparatively high frequency band is obtained, which has a signal value distribution shown in FIG. 5B. Also, a signal of a comparatively low frequency band is obtained, which has a signal value distribution shown in FIG. 5C. When the signal of the comparatively low frequency band shown in FIG. 5C is compared with the signal of the comparatively high frequency band shown in FIG. 5B, it will be found that the signal of the comparatively low frequency band shown in FIG. 5C has the characteristics such that, in the region corresponding to the portion B, the signal value may be larger than the signal values of the other regions. The degree of emphasis is determined by comparing the signal values with the threshold value $\alpha$.

Figure 6:
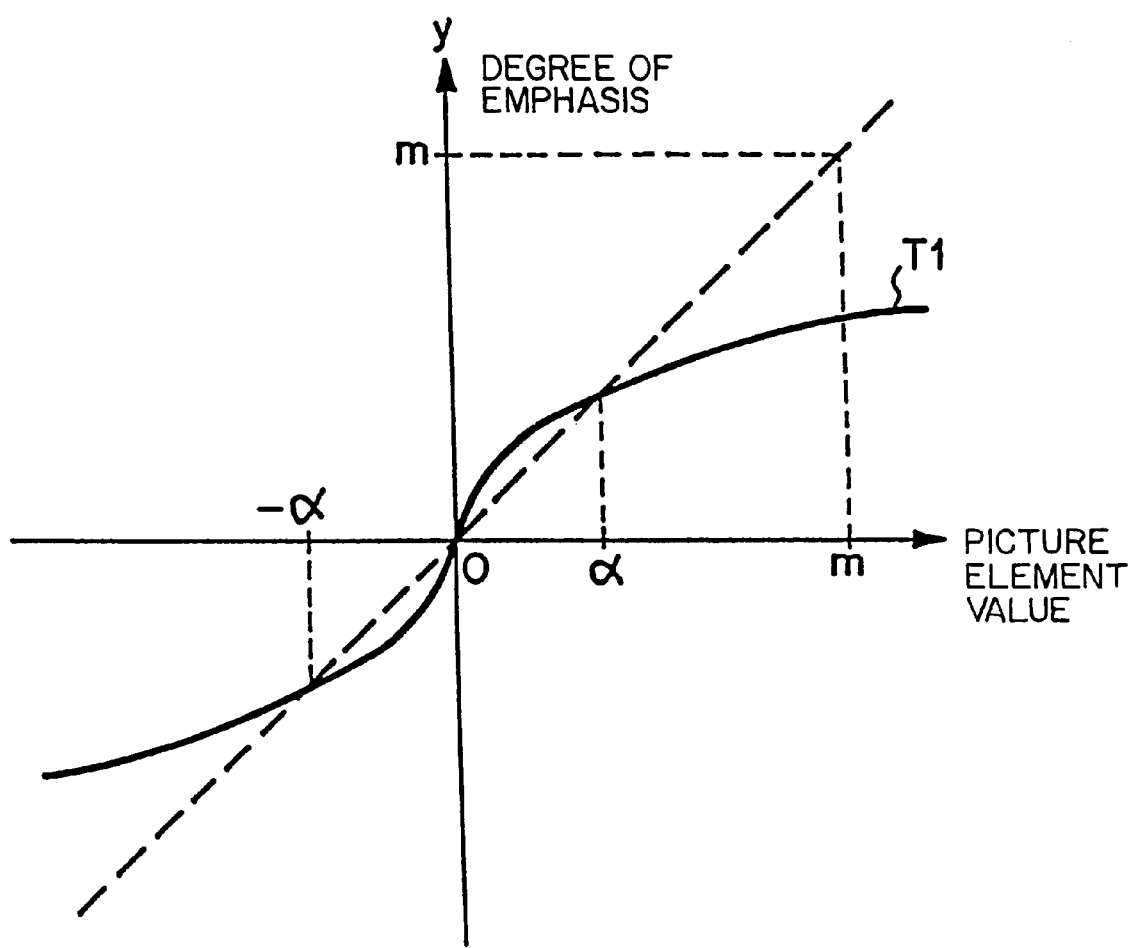
FIG. 6 is a graph showing an example of a table representing a degree of emphasis.

FIG. 6 shows a table T1, which is used in order to determine the degree of emphasis and is stored in the table storing means 6. As illustrated in FIG. 6, with the table T1, when the signal value of the detail image $b_k$ is larger than the threshold value $\alpha$, the signal is restricted. When the signal value of the detail image $b_k$ is smaller than the threshold value $\alpha$, the signal is emphasized. In FIG. 6, m represents the range of values, which the picture elements can take. For example, m=1,023 in cases where the range of values, which the picture elements can take, is 10 bits. In such cases, the threshold value $\alpha$ is approximately equal to 256. In accordance with the table T1, the emphasis processing is carried out on the image of the high frequency band shown in FIG. 5B and the image of the low frequency band shown in FIG. 5C.

Figure 5F:
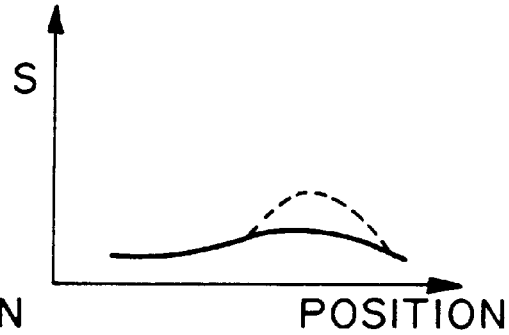
FIG. 5F is a graph showing a profile of an image signal representing an image of a comparatively low frequency band, which has been obtained from emphasis processing.

With the emphasis processing carried out in the manner described above, as illustrated in FIG. 5F, as for the image of the low frequency band shown in FIG. 5C, the signal is restricted. Also, as illustrated in FIG. 5E, as for the image of the high frequency band shown in FIG. 5B, the signal is emphasized.

Thereafter, an inverse transform is carried out on the detail image $b_k$ of the predetermined frequency band, which image has been obtained from the emphasis processing, and the detail images of the other frequency bands. The restoration processing means 4 carries out the inverse transform processing in the manner described below.

Figure 7:
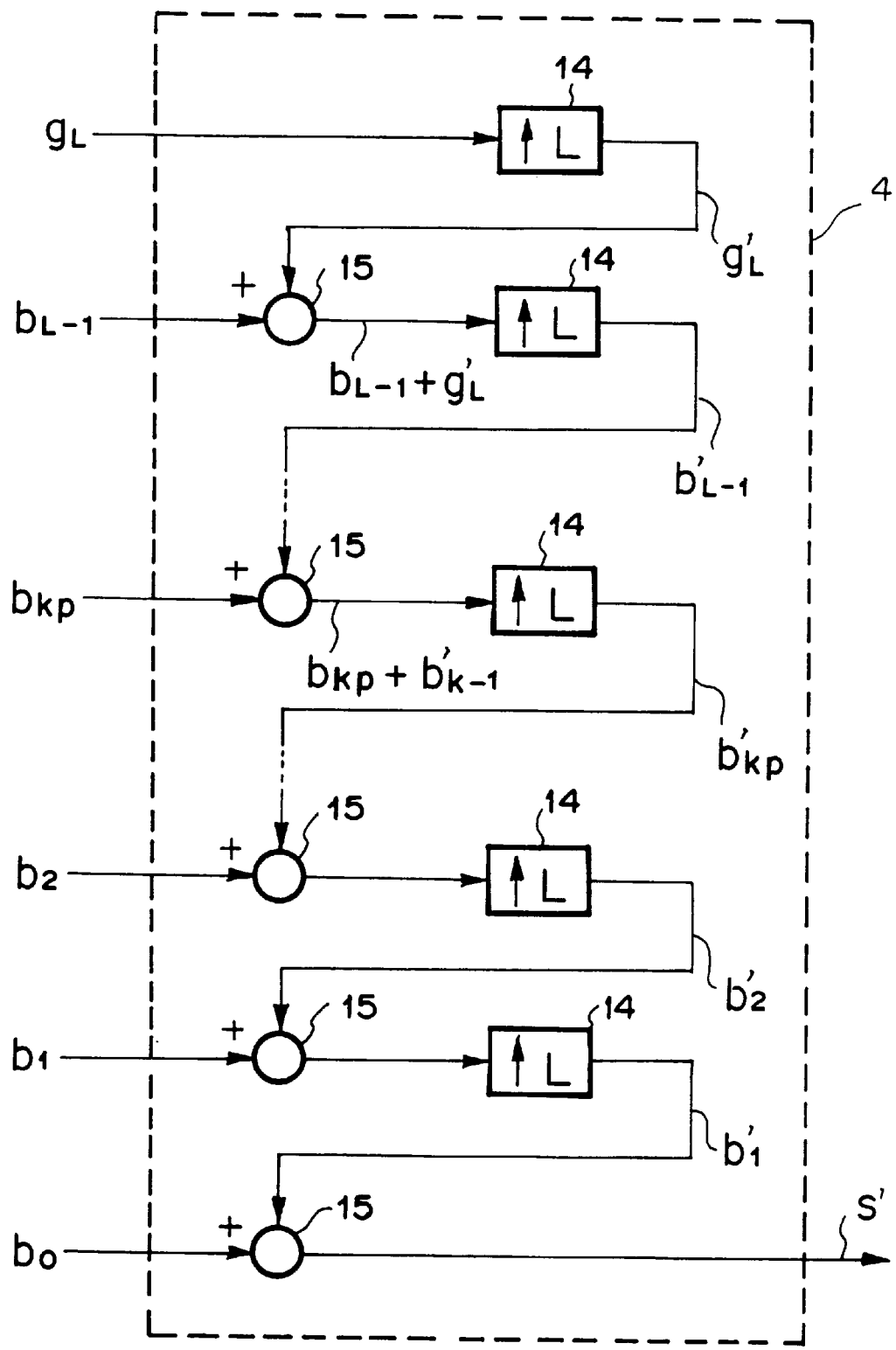
FIG. 7 is a block diagram showing a restoration processing means.

FIG. 7 shows how the inverse transform of the detail images is carried out. Firstly, the image signal representing the residual image $g_L$ is fed into a first interpolating operation means 14. In the first interpolating operation means 14, picture elements are inserted between adjacent picture elements of the residual image $g_L$, and an image signal representing an image $g_L'$, which has a size four times as large as the size of the residual image $g_L$, is thereby obtained. The image signal representing the image $g_L'$ having been obtained from the interpolating operation is then fed into a first adder 15. In the first adder 15, the image signal components of the image signal representing the image $g_L'$ and the image signal representing a lowest resolution detail image $b_{n-1}$, which image signal components represent corresponding picture elements in the two images, are added to each other. An image signal representing an addition image $(g_L'+b_{n-1})$ is thereby obtained. The image signal representing the addition image $(g_L'+b_{n-1})$ is then fed into a second interpolating operation means 14. In the second interpolating operation means 14, picture elements are inserted between adjacent picture elements of the addition image $(g_L'+b_{n-1})$, and an image signal representing an image $b_{n-1}40$, which has a size four times as large as the size of the addition image $(g_L'+b_{n-1})$, is thereby obtained.

Thereafter, the image signal representing the image $b_{n-1}'$ is fed into a second adder 15. In the second adder 15, the image signal components of the image signal representing the image $b_{n-1}'$ and the image signal representing a detail image $b_{n-2}$ of a resolution higher by a single level than the resolution of the detail image $b_{n-1}$, which image signal components represent corresponding picture elements in the two images, are added to each other. An image signal representing an addition image $(b_{n-1}'+b_{n-2})$ is thereby obtained. The image signal representing the addition image $(b_{n-1}'+b_{n-2})$ is then fed into a third interpolating operation means 14. In the third interpolating operation means 14, picture elements are inserted between adjacent picture elements of the addition image ($b_{n-1}'+b_{n-2}$), and an image signal representing an image $b_{n-2}'$, which has a size four times as large as the size of the detail image $b_{n-2}$, is thereby obtained.

The processing described above is iterated, and the same processing is carried out also for the emphasized image $b_{kp}$. Specifically, in an adder 15, the image signal representing the emphasized image $b_{kp}$ and the image signal representing an image $b_{k-1}'$, which is of a resolution lower by a single level than the resolution of the emphasized image $b_{kp}$ and has been obtained from the processing described above, are added to each other. An image signal representing the addition image ($b_{kp}+b_{k-}'$) is thereby obtained. Thereafter, in an interpolating operation means 14, picture elements are inserted between adjacent picture elements of the addition image ($b_{kp}+b_{k-}'$), and an image signal representing an interpolation image $b_{kp}'$ is thereby obtained. The processing is successively carried out for the detail images of higher frequency bands. Finally, in an adder 15, an image signal representing an interpolation image $b_1'$ and an image signal representing the detail image $b_0$ having the highest resolution are added to each other, and a processed image signal S' is thereby obtained. As illustrated in FIG. 5D, the processed image signal S' has the characteristics such that the signal values of the regions surrounding the portion B are smaller than those in the image signal representing the original image.

The processed image signal S' having thus been obtained is fed into the image output means 5 and used in the reproduction of a visible image. The image output means 5 may be constituted of a display means, such as a cathode ray tube (CRT) display means, a recording apparatus for recording an image on photographic film by a light beam scanning operation, or a device for storing an image signal in an image file on an optical disk, a magnetic disk, or the like.

In the manner described above, the detail images are obtained from the multi-resolution transform carried out with the Laplacian pyramid technique, and the degree of emphasis for the detail image of a desired frequency band, which is to be subjected to the emphasis processing, is set in accordance with each of the picture element values of the picture elements of the image of the desired frequency band. Specifically, in cases where the picture element value is larger than the threshold value $\alpha$, the degree of emphasis is restricted. In cases where the picture element value is smaller than the threshold value $\alpha$, the degree of emphasis is emphasized. Therefore, even if the density of the regions surrounding the portion, which is to be used, is comparatively high as in the image represented by the image signal shown in FIG. 5A, the density of the regions surrounding the portion to be used can be rendered low. Therefore, the level of contrast of the portion, which is to be used, with respect to the surrounding regions can be kept high, and a processed image can be obtained which is more perceptible.

In the embodiment described above, for example, in cases where the range of values, which the picture elements can take, is 10 bits, the threshold value $\alpha$ may set to be approximately equal to 256. However, the threshold value $\alpha$ is not limited to this value and may be altered in accordance with the range of values, which the picture elements can take, the kind of the image, or the like.

Figure 8:
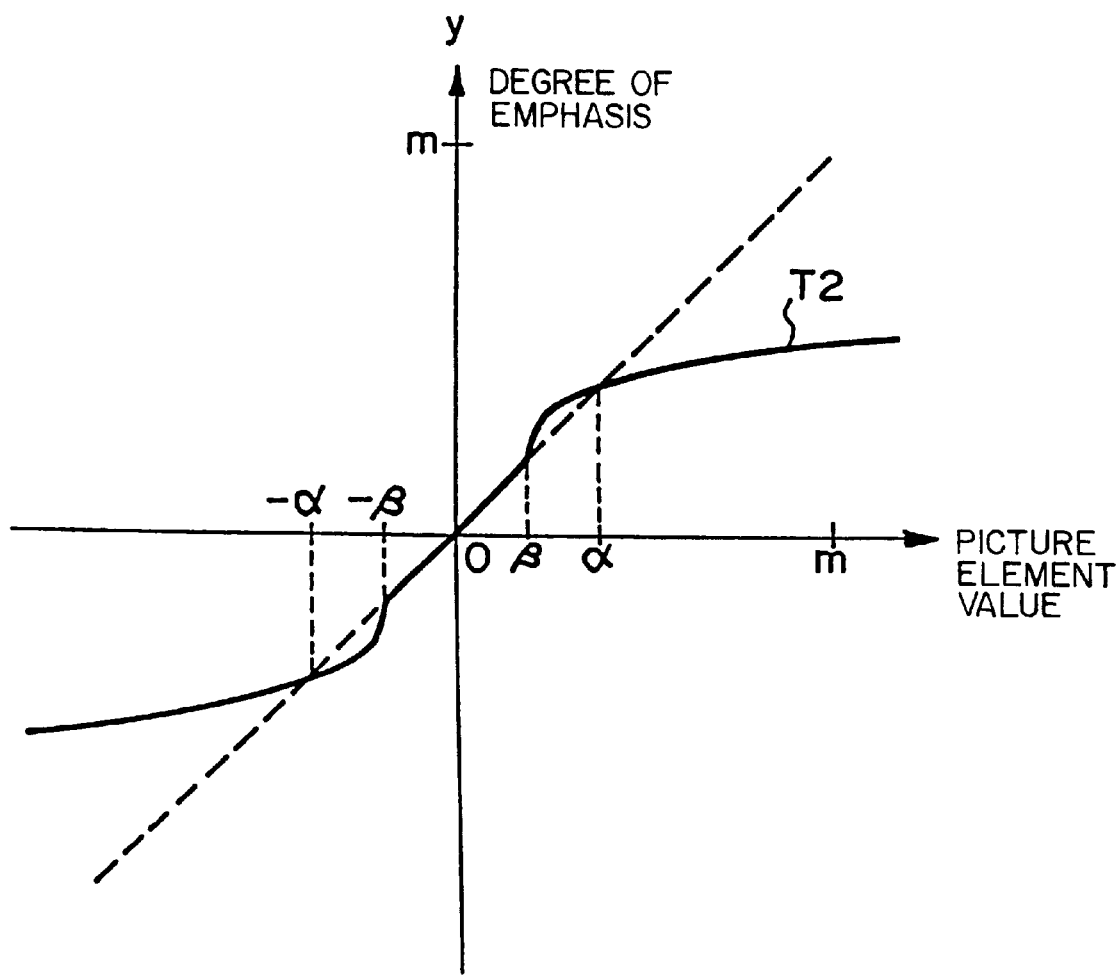
FIG. 8 is a graph showing a different example of a table representing a degree of emphasis.

Also, in the embodiment described above, the table T1 shown in FIG. 6 is utilized in order to determine the degree of emphasis. Alternatively, a table T2 shown in FIG. 8 may be utilized. As illustrated in FIG. 8, the table T2 has the characteristics such that the signal may be restricted in cases where the picture element value is larger than the threshold value $\alpha$, and such that emphasis and restriction may not be carried out in cases where the picture element value is smaller than a threshold value $\beta$. In cases where the table T2 is utilized, a portion, which has a very small picture element value and can be considered as being noise, is not emphasized. Therefore, a processed image, in which noise is imperceptible and which has good image quality, can be obtained.

Further, in the embodiment described above, the transform of the original image into the multi-resolution images is carried out by utilizing the Laplacian pyramid technique. However, the image processing method in accordance with the present invention is not limited to the use of the Laplacian pyramid technique. For example, the transform of the original image into the multi-resolution images may be carried out by utilizing one of other techniques, such as a wavelet transform or a sub-band transform.

The wavelet transform has recently been developed as a frequency analysis method and has heretofore been applied to stereo pattern matching, signal compression, and the like. The wavelet transform is described in, for example, "Wavelets and Signal Processing," by Olivier Rioul and Martin Vetterli, IEEE SP Magazine, pp. 14–38, October 1991; and "Zero-Crossings of a Wavelet Transform," by Stephane Mallat, IEEE Transactions on Information Theory, Vol. 37, No. 4, pp. 1019–1033, July 1991.

With the wavelet transform, a signal is transformed into frequency signals, each being of one of a plurality of different frequency bands, in accordance with the formula $$W(a,b) = \int_{-\infty}^{\infty} f(t) h(a,b) dt \quad (1)$$

wherein f(t): the signal having an arbitrary wave form,
W(a,b): the wavelet transform of f(t), $$h(a,b) = \frac{1}{\sqrt{a}} h(at-b)$$

a: the degree of contraction of the function,
b: the amount of movement in the horizontal axis direction.

Specifically, the filtering process is carried out by changing the period and the degree of contraction of the function h and moving the original signal. In this manner, frequency signals adapted to desired frequencies ranging from a fine frequency to a coarse frequency can be prepared.

The sub-band transform includes the technique for obtaining the images of two frequency bands by utilizing a single kind of filter as in the wavelet transform, and the technique for obtaining the images of a plurality of frequency bands with a single simultaneous operation by utilizing a plurality of kinds of filters.

Also, after the images of plurality of different frequency bands are obtained from the wavelet transform or the sub-band transform, the emphasis processing may be carried out in the same manner as that described above for the Laplacian pyramid technique. In this manner, the emphasis processing can be carried out such that the image information of the desired frequency band may be emphasized, and such that the unnecessary components, such as noise components, contained in the desired frequency band may not be emphasized. Therefore, a processed image can be obtained, in which noise is imperceptible and which has good image quality and can serve as an effective tool in, particularly, the efficient and accurate diagnosis of an illness.

What is claimed is:

1. An image processing method, comprising the steps of:

transforming an original image into a multi-resolution space, the original image being thereby decomposed into images, each of which is of one of a plurality of different frequency bands;

carrying out emphasis processing on an image of a predetermined frequency band representing a detail image component of said original image, said predetermined frequency band being among the plurality of the different frequency bands, by setting the degrees of emphasis such that the degree of emphasis for a picture element of the image of the predetermined frequency band is as follows:

when said picture element has a picture element value between a first predetermined threshold value and a second predetermined threshold value, said degree of emphasis is set so as not to emphasize and not to de-emphasize said picture element value, said first and second predetermined threshold values having an identical absolute value, said first predetermined threshold being greater than zero, said second predetermined threshold being less than zero, when said picture element has said picture element value greater than said first predetermined threshold value but less than a third predetermined threshold value, said degree of emphasis is set so as to emphasize said picture element value, when said picture element has said picture element value less than said second predetermined threshold value but greater than a fourth predetermined threshold value, said degree of emphasis is set so as to emphasize said picture element value, said third and fourth predetermined threshold values having an identical absolute value, said third predetermined threshold being greater than zero, said fourth predetermined threshold being less than zero, when said picture element has said picture element value greater than said third predetermined threshold value, said degree of emphasis is set so as to de-emphasize said picture element value, and when said picture element has said picture element value less than said fourth predetermined threshold value, said degree of emphasis is set so as to de-emphasize said picture element value; and carrying out an inverse transform of the image of the predetermined frequency band, which has been obtained from said emphasis processing, and the images of the other frequency bands, a processed image signal being obtained from the inverse transform.

2. A method as defined in claim 1 wherein said transform of the original image into the multi-resolution space is carried out with a technique selected from the group consisting a Laplacian pyramid technique, a wavelet transform, and a sub-band transform.

3. A method as defined in claim 2 wherein the original image is a radiation image.

4. An image processing apparatus, comprising:

image decomposing means for transforming an original image into a multi-resolution space, the original image being thereby decomposed into images, each of which is of one of a plurality of different frequency bands;

emphasis processing means for carrying out emphasis processing on an image of a predetermined frequency band representing a detail image component of said original image, said predetermined frequency band being among the plurality of the different frequency bands, by setting the degrees of emphasis such that the degree of emphasis for a picture element of the image of the predetermined frequency band is as follows:

when said picture element has a picture element value between a first predetermined threshold value and a second predetermined threshold value, said degree of emphasis is set so as not to emphasize and not to de-emphasize said picture element value, said first and second predetermined threshold values having an identical absolute value, said first predetermined threshold being greater than zero, said second predetermined threshold being less than zero, when said picture element has said picture element value greater than said first predetermined threshold value but less than a third predetermined threshold value, said degree of emphasis is set so as to emphasize said picture element value, when said picture element has said picture element value less than said second predetermined threshold value but greater than a fourth predetermined threshold value, said degree of emphasis is set so as to emphasize said picture element value, said third and fourth predetermined threshold values having an identical absolute value, said third predetermined threshold being greater than zero, said fourth predetermined threshold being less than zero, when said picture element has said picture element value greater than said third predetermined threshold value, said degree of emphasis is set so as to de-emphasize said picture element value, and when said picture element has said picture element value less than said fourth predetermined threshold value, said degree of emphasis is set so as to de-emphasize said picture element value; and inverse transform means for carrying out an inverse transform of the image of the predetermined frequency band, which has been obtained from said emphasis processing, and the images of the other frequency bands, a processed image signal being obtained from the inverse transform.

5. A method as defined in claim 4 wherein said transform of the original image into the multi-resolution space is carried out with a technique selected from the group consisting a Laplacian pyramid technique, a wavelet transform, and a sub-band transform.

6. A method as defined in claim 5 wherein the original image is a radiation image.

* * * * *